United States Patent [19]

Caillet et al.

[11] 4,314,369
[45] Feb. 2, 1982

[54] DIGITAL CODING PROCESS FOR RECORDING SOUND CHANNELS WITH A TELEVISION SIGNAL AND APPARATUS REALIZING THIS PROCESS

[75] Inventors: Pierre Caillet; Rene Romeas, both of Paris, France

[73] Assignee: Thomson-Brandt, Paris, France

[21] Appl. No.: 88,459

[22] Filed: Oct. 25, 1979

[30] Foreign Application Priority Data

Oct. 25, 1978 [FR] France .................. 78 30316

[51] Int. Cl.³ ............................................. G06F 11/14
[52] U.S. Cl. ............................. 371/69; 340/347 DD; 375/26
[58] Field of Search ........... 371/69, 2, 36; 340/347 DD; 375/26, 34

[56] References Cited

U.S. PATENT DOCUMENTS 3,678,389  7/1972  Heers et al. ............ 340/347 DD X
4,047,151  9/1977  Rydbeck et al. ................ 375/26 X
4,132,975  1/1979  Koike .............................. 371/69 X

FOREIGN PATENT DOCUMENTS 2375782  12/1977  France .

OTHER PUBLICATIONS

"*Journal of the Audio Engineering Society*"; vol. 26, No. 7/8;Jul/Aug. 1978; Willcocks: Some Notes on Digital Audio Topics, pp. 549-553.

"*Wireless-World*"; vol. 81, No. 1474, Jun. 1975; Dwyer: Digital Techniques in Recording and Broadcasting, pp. 248-253.

"IBM Technical Disclosure Bulletin", vol. 17, No. 5, Oct. 1974, Maddens et al: Digital-to-analog converter for low-level PCM-signals, pp. 1383-1384.

"Electronique Industrielle"; No. 116, Sep. 1968; Chaskilevitch: Conversion numerique-analogique Par circui integre, pp. 579-585.

"Radio Mentor Electronic"; vol. 39, No. 1, Jan. 1973; PCM Für Bessere Schallplatten, pp. 030-031.

*Primary Examiner*—David H. Malzahn
*Attorney, Agent, or Firm*—Cushman, Darby & Cushman

[57] ABSTRACT

In an audiovisual signals diffusion apparatus, a digital coding process for protecting coded digital sound signals alternately recorded with video signals against alterations or deteriorations encountered during the transcription process onto a recording carrier or support, comprising the steps of selectively protecting signals representing low analog levels against large erroneous variations, transmitting several times the thus protected signals and garbling the different bits of successively transmitted digital signals, said process being compatible with the multiplexed recording of several sound channels.

22 Claims, 9 Drawing Figures

Fig. 5 PRIOR ART

| V | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| +V | 1 | 1 | 1 | 1 | 1 | 1 | 1 | 1 | 1 | 1 |
| $0+\varepsilon$ | 1 | 0 | 0 | 0 | 0 | 0 | 0 | 0 | 0 | 0 |
| $0-\varepsilon$ | 0 | 1 | 1 | 1 | 1 | 1 | 1 | 1 | 1 | 1 |
| −V | 0 | 0 | 0 | 0 | 0 | 0 | 0 | 0 | 0 | 0 |

Fig. 6

| V | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| +V | 1 | 1 | 1 | 1 | 1 | 1 | 1 | 1 | 1 | 1 |
| $0+\varepsilon$ | 1 | 0 | 0 | 0 | 0 | 0 | 0 | 0 | 0 | 0 |
| $0-\varepsilon$ | 0 | 0 | 0 | 0 | 0 | 0 | 0 | 0 | 0 | 0 |
| −V | 0 | 1 | 1 | 1 | 1 | 1 | 1 | 1 | 1 | 1 |

| A | B | A' | B' | A'' | B'' |
|---|---|---|---|---|---|

Fig. 7 PRIOR ART

| $A_1$ | $B_1$ | $A_2$ | $A'_1$ | $B'_1$ | $B_2$ | $A''_1$ | $B''_1$ |
|---|---|---|---|---|---|---|---|

Fig. 8

DIGITAL CODING PROCESS FOR RECORDING SOUND CHANNELS WITH A TELEVISION SIGNAL AND APPARATUS REALIZING THIS PROCESS

BACKGROUND OF THE INVENTION

The invention relates to apparatus and methods for the digital coding of sound signals accompanying a recording made in successive segments at a television image change rate. These signals are stored on the recording carrier of an audiovisual signal diffusion system and in particular comprising a video disc.

It is known to record sound on a video disc by means of samples occupying the time intervals allocated to the beam return trace of the video signal of a colour television image. This recording can relate to a single wide band sound channel or to two multiplexed sound channels.

It is also known that the digital transmission of information has a signal/noise ratio which is generally higher than the analog transmission.

However, the digital recording of information is not free from all problems and defects. Losses or deterioration to bits, particularly in connection with the reading of a recording or structual defects on the recording carrier influence the integrity of the message to be transmitted.

This problem is well known, for example, in teletransmissions or in recording methods intended for information processing. It has been eliminated by various processes, including the use of redundant codes such as multiple error detection codes—simple error correction associated possibly with parity bits.

All these processes involve the use of costly and complex equipment and are therefore unsuitable for the purposes of the invention. In addition, as the time intervals allocated to the beam return trace of the video signal have a limited duration they are relatively unsuited to the use of long codes resulting from a high redundancy. Experimental data also show curves giving the frequency of the faults as a function of the duration which, for the recording carriers used within the scope of the invention make it possible to envisage a better choice of error correction methods.

Finally note should be taken of the physiological characteristics of the ear which permit certain tolerances with regard to the integrity of the signal read and reproduced with respect to the original signal. Thus, it would appear possible to only protect the high weight (most significant) bits of the digital signals. Deterioration of the low weight (least significant) bits would only represent the low amplitude erroneous fluctuations of the sound signal and the human ear could adapt to these.

BRIEF SUMMARY OF THE INVENTION

To obviate the disadvantages and limitations referred to hereinbefore the present invention relates to a process for the digital coding of alternating analog signals at acoustic frequencies which are to be alternately recorded with video signals in an audiovisual signal diffusion apparatus comprising an analog-digital converter with parallel outputs, said process aiming at protecting the thus coded digital signals against alterations encountered during the transcription process, wherein it comprises the following stages:

the digital signals present at the output of the analog-digital converter undergo a first transformation in accordance with a first law able to protect the digital signals representing low analog levels against large erroneous variations due to a deterioration of only a few bits;

the digital signals transformed in this way are transmitted several times after parallel-series conversions;

the successively transmitted digital signals undergo a second transformation in accordance with a second law permitting a subsequent error detection during an overall deterioration.

The invention also relates to a digital coding process compatible with the multiplexed recording of several sound signal channels.

The invention also relates to a coder and a decoder for an audiovisual signal diffusion system using the said digital coding process.

BRIEF DESCRIPTION OF THE DRAWINGS

The invention will be described in greater detail hereinafter relative to non-limitative embodiments and the attached drawings, wherein show:

FIG. 5 a table for converting an analog signal into a digital signal according to the prior art.

FIG. 7 a diagram explaining the repetition of multiplexed digital signals transmitted in conventional triple redundancy.

FIG. 8 a diagram explaining the repetition of multiplexed digital signals transmitted according to a distribution law.

FIG. 9 a curve illustrating the folt appearance frequence as a function of their duration.

DETAILED DESCRIPTION OF THE PREFERRED EMBODIMENTS

Figure 1:
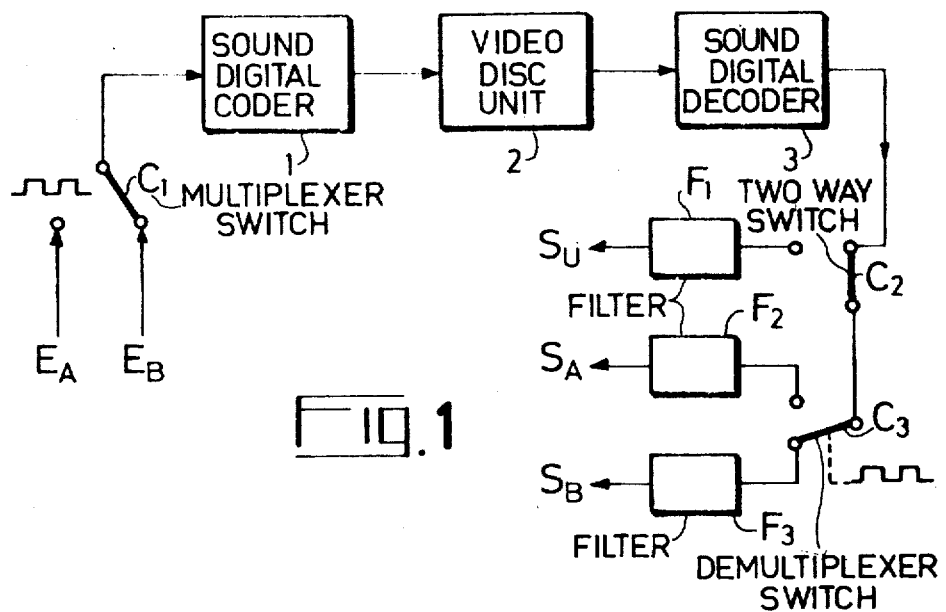
FIG. 1 a basic circuit diagram of an audiovisual signal diffusion system using the process according to the invention.

FIG. 1 diagrammatically illustrates the different functions of an audiovisual signal diffusion system which, according to a preferred application, is constituted by a recorder-reader of video discs to which can be applied the digital coding process according to the invention of sound signals with a single wide band channel or two multiplexed narrower band channels. As only sound recording falls within the scope of the invention members not connected therewith will not be described.

The recorder-reader system firstly comprises a sound coder 1 which receives the analog signals from two sound channels (channels A and B) at its input EA and EB. The coder essentially comprises an analog-digital convertor to which is applied via a multiplexer represented by switch $C_1$ one of the two analog channels. The results of the conversions are recorded by known methods following a special coding according to the invention, which will be described hereinafter. The recording support or carrier can be that of a video disc recording and reading assembly 2 on which appears the information which is subsequently to be read by the optical pickups, which constitute the reading means of a sound decoder 3. The read and decoded signals are then transmitted by a digital-analog converter through switch $C_2$.

The analog-digital convertor 1 operates at the rate of one complete conversion during each half line of the television signal. Consequently this rate gives a sound signal sampling frequency which is twice the line frequency, i.e. 31, 250 Hz in standard 625 lines/25 images/second. This frequency gives us the possibility of transmitting a maximum pass band signal of approximately 15 kHz. This possibility is obtained by locking switch $C_1$ on one of the positions of channel A or channel B which are transmitted to the reflective inputs EA, EB serving as a single input and by positioning $C_2$ on the output filter $F_1$, whose pass band is 15 kHz (output Su).

Switch $C_1$ is now operated at the rate of the line frequency synchronously with the analog-digital convertor in such a way that the first conversion occurs when switch $C_1$ permits the passage of channel A to input EA and the second conversion when switch $C_1$ permits the passage of channel B to input EB (the 3rd: channel A, the 4th: channel B, etc.), it can be seen that the uneven samples correspond to channel A and the even samples to channel B. By positioning switch $C_2$ towards $C_3$ and by controlling switch $C_3$ with a signal identical to that controlling $C_1$, i.e. at the line frequency rate it is sufficient in the decoder to direct the uneven samples towards filter $F_2$ (channel A) and the even samples to filter $F_3$ (channel B) to recover the signals of channels A and B available at outputs SA, SB in a completely separate and independent manner. As sampling on each of these channels now only takes place at a rate of 15,625 Hz the pass band of each of these channels is therefore max approximately 7.5 kHz and filters $F_2$ and $F_3$ are designed on a basis of this.

Before providing a more detailed description relative to the drawings reference is briefly made to the principle of the digital conversion of a sound analog signal.

The sound analog signal to be transmitted is converted by an analog-digital converter with parallel outputs of a known type into a binary digital signal having ten bits of weights $2^0$ to $2^9$ at the rate of two conversions per television line (samples).

On entry the sound analog signal can vary around the value 0 by a quantity varying from $\pm OV$ to $\pm Vmax$. ($\pm OV$ representing a silence and $\pm Vmax$. the maximum sound power). On leaving a known analog-digital converter there is a digital representation (multibit digital word) of the analog signal to be converted given by the table of FIG. 5.

It can immediately be seen that in the vacinity of value 0, i.e. in the silent zones a reproduction error on the single highest weight bit can lead to the signal reproduced passing from value $0+\div$ to value $-Vmax$. or from from value $0-\div$ to value $+Vmax$., whereby this even brief error gives us an unpleasant crackling in the ear. However, it is precisely in the zones of silence that crackling is most readily audible, because it is not covered by any other noise. It is therefore appropriate to give maximum protection to this highest weight bit and this is obtained in the following manner.

Figure 6:
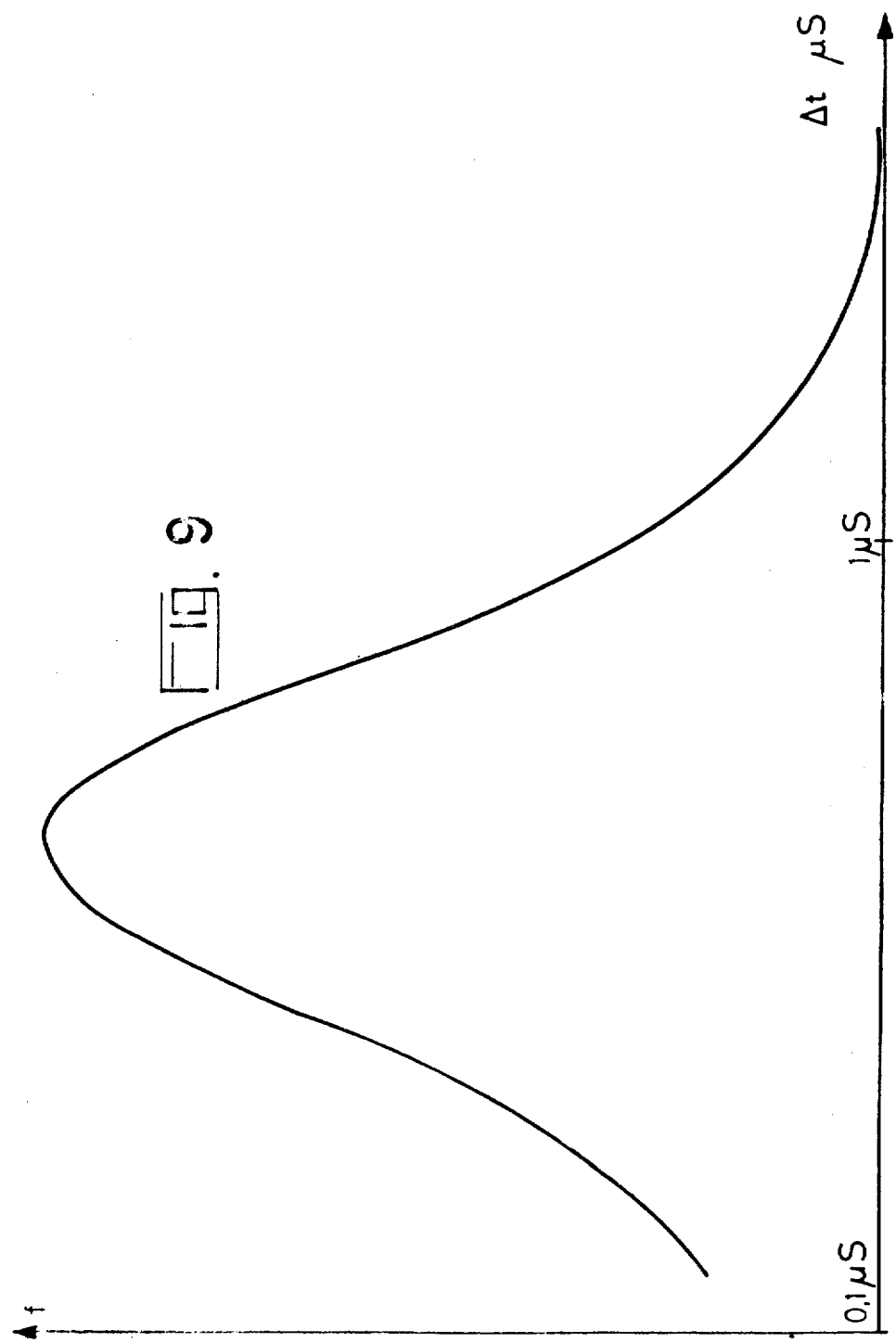
FIG. 6 a table for converting an analog signal into a digital signal according to a first variant of the invention.

When the input signal is between 0 and $+Vmax$. the ten bits of the corresponding digital signal are transmitted without intervention. However, when the input signal is between $-Vmax$. and 0 the highest rate bit is transmitted without intervention and the twos compliments for each of the nine other bits, which gives us the representation of the table of FIG. 6 illustrating a first variant of the process according to the invention.

Reading of the table immediately shows that an error on the highest weight bit in the vacinity of the 0 value (silent zone) has no significant impact on the signal reproduced. It merely changes the reproduced signal from $0 + \div$ to $0 - \div$ or vice versa. The bits are then transmitted in the form $2^9, 2^9 \oplus 2^8, 2^9 \oplus 2^7, \ldots, 2^9 \oplus 2^0$.

This can be obtained by means of simple logic elements (inverter, EXCLUSIVE-OR).

On referring now to the graph of FIG. 9 showing the curve giving the frequency of the alterations (ordinate F) as a function of their duration (abscissa $\Delta t$) for a signal recorded and then read from a video disc recording support it can be seen that the largest number of alterations due to signal losses on average last less than a microsecond. These results are utilised in an advantageous manner hereinafter.

FIG. 7 shows a conventional recording with triple redundancy, which has the disadvantage of being in the form of a very long message, although it gives a good protection of the message to be recorded.

It is obvious that a reproduction error does not have the same significance if it affects one or more higher order bits ($2^9, 2^8, 2^7, 2^6, 2^5$) as when it affects one or more lower order bits ($2^0, 2^1, 2^2, 2^3, 2^4$,) and error on the latter when occurring on no more than 10% of the samples having no significant incidence for the listener. Therefore for space reasons we have decided only to protect the five highest weight bits. However, it is obviously possible to protect more or less than five bits without changing the principle of the invention.

Therefore FIG. 8 shows a more selective protection according to a second variant of the invention. This protection is obtained by transmitting three times, for example the five highest weight bits, each of these transmissions being separated from the two others by the longest possible time interval. As there is only a single transmission channel all the bits forming the sound signals of channels A and B, together with their repetitions will be transmitted in series, whereby to satisfy the condition indicated hereinbefore of having a maximum space between the transmissions of the same signal the configuration given in FIG. 8 is adopted for the train of bits forming the sound signals to be transmitted during the line flyback, i.e.:

5 high weight bits A: 1st transmission $A_1$,
2nd transmission $A'_1$, 3rd transmission $A''_1$.
5 high weiight bits channel B: 1st transmission $B_1$, 2nd transmission $B'_1$, 3rd transmission $B''_1$.
5 low weight bits channel A: single transmission $A_2$.
5 low weight bits channel B: single transmission $B_2$.

As is apparent from the drawing two successive transmissions of the same five bit word ($A_1$, $A'_1$, $A''_1$ of $B_1$, $B'_1$, $B''_1$) are always separated in time by the transmission of two other five bit words. The transmission time of each five bit word being about one microsecond a signal loss or an erroneous signal lasting less than two microseconds can only affect one of the three transmissions of words A or B, whilst the condition under which the transmitted word is considered good for reproduction is at least two of these three transmissions of the same word are identical, i.e. not affected by any error according to the well known majority vote method. Thus, in practice it is necessary to obtain one of the following conditions: $A_1 = A''_1 = A''_1$ or $A_1 = A'_1$ or $A_1 = A''_1$ or $A'_1 = A''_1$ (ditto for channel B).

As the scale is the same in FIGS. 7 and 8 it can also be seen that the message transmitted according to the configuration of the process of the invention is significantly shortened compared with a message coded according to the strict triple redundancy principle and is better adpated to the short time interval of the beam returning trace, whilst still giving an adequant protection.

In certain much less frequently encountered cases (see FIG. 9) the signal losses or errors can exceed two microseconds and therefore affect the transmission of two successive identical words (e.g. $A_1$ and $A'_1$ or $A'_1$ and $A''_1$). It should be noted that it is possible to compare with a single long error or signal loss two short errors or signal losses affecting the transmission of two identical words ($A_1$ and $A'_1$, $A_1$ and $A''_1$, $A'_1$ and $A''_1$).

Except in exceptional cases where the erroneous words are completely identical it is possible under these conditions to obtain one of the equality conditions referred to hereinbefore ($A_1 = A''_1$; $A'_1 = A''_1$, $A_1 = A''_1$). It is then sufficient, when each of these equalities is not checked, either to reconstitute the lost signal by averaging the signal transmitted on the previous line and the signal transmitted on the following line or in a much simpler manner by retaining the value of the signal in the previous line. Although the second procedure introduces a slight distortion of the signal reproduced it does not lead to an appreciable fault for the ear, provided that it only occurs in a spaced manner (less than ten times per minute). This constitutes a well known practice not covered by the scope of the invention and which will not therefore be described further.

As can be gathered from the above paragraph in certain exceptional cases a long error or signal loss could impair two transmissions of identical words ($A_1$ and $A'_1$ for example) in such a way that these two words remained alike ($A_1 = A'_1$). As the equality is still checked the system could consider that these two erroneous words were good. This condition more particularly occurs when a long signal error or loss brings to 0 to 1 all the bits of several successive words.

To obviate this disadvantage according a third variant of the process of the invention the bits of each of the successively transmitted identical words are garbled during coding and undergo the reverse treatment during decoding, so that bits $2^9$, $2^8$, $2^7$, $2^6$, $2^5$ are transmitted in the following manner:

| | |
|---|---|
| in words $A_1$ or $B_1$ | $2^9$, $2^8$, $2^7$, $2^6$, $2^5$ |
| in words $A_1'$ of $B_1'$ | $2^9$, $2^8$, $2^7$, $2^6$, $2^5$ |
| in words $A_1''$ or $B_1''$ | $2^9$, $2^8$, $2^7$, $2^6$, $2^5$ |

Thus, for example, an error having the affect of returning to zero all the bits of words $A_1$, $A'_1$ and $A''_1$ as transmitted would give after ungarbling treatment:

| | |
|---|---|
| $A_1 = 0\ 0\ 1\ 1\ 0$ | as a result there are none |
| $A_1' = 0\ 1\ 1\ 0\ 0$ | of the equalities $A_1 = A_1'$ |
| $A_1'' = 1\ 1\ 0\ 0\ 1$ | $A_1 = A_1''$ |
| | $A_1 = A_1'''$ | this example is not limitative and other ways of garbling the bits could be used. It should be noted that only the highest rate bits are garbled for the reasons hereinbefore.

Despite all the precautions taken in the concept of coding it is possible to encounter certain very rare cases when two incorrect words are identical. This would in particular be the case when two extremely short signal losses or errors (<200 nanoseconds) affected in an identical manner a bit of the same rank and transmitted in the same direction in two of the three successively transmitted words ($A_1$ and $A'_1$, $A_1$ and $A''_1$ or $A'_1$ and $A''_1$) for example inversion of the bit $2^7$ both in $A_1$ and $A'_1$:

| | garbled | | result |
|---|---|---|---|
| original word | transmitted word | erroneous word | after ungarbling |
| $A_1$  1 0 0 1 1 | 1 0 1 0 1 | 1 0 0 0 1 | 1 0 1 1 1 |
| $A_1'$ 1 0 0 1 1 | 1 1 1 1 1 | 1 1 0 1 1 | 1 0 1 1 1 |

It is immediately apparent from the above example that the reproduced word differs from the original word and is therefore erroneous, whilst retaining the equality $A_1 = A'_1$.

In the presence of two words which are alike on decoding it is merely necessary to check that the error detection system called an "anti-drop-out" with which the video disc reader is equipped has detected the reading error during the time when words $A_1$, $A'_1$ or $A''_1$ or ($B_1$, $B'_1$, $B''_1$) were transmitted to remove all doubts. The use of such a system is well known to the expert and its operation is not described in detail.

In practice cases of erroneous equalities described hereinbefore only occur very rarely and the improvement provided by this supplementary arrangement is only significant when using damaged supports or the damage being so extensive that the actual video signals are degraded and the image observed on the screen is resultingly deteriorated.

Figure 2:
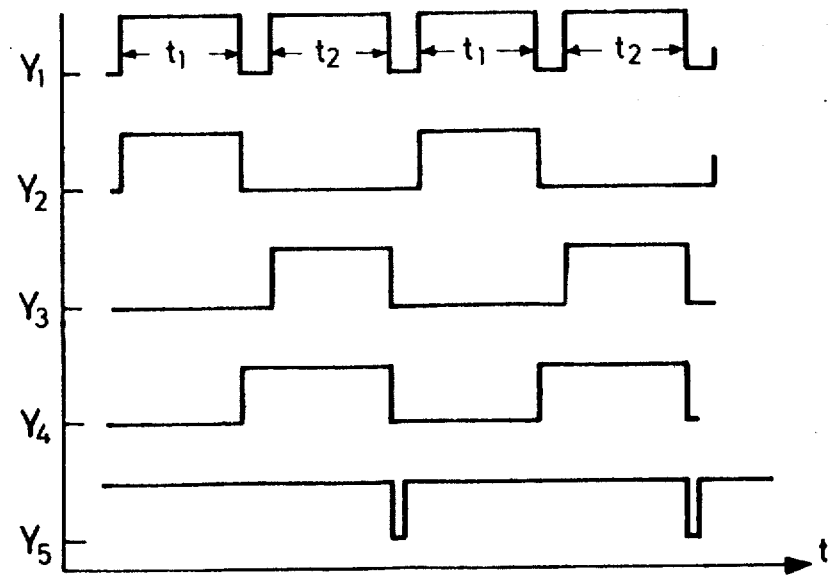
FIG. 2 a time diagram of the main operating phases of a coder according to the invention.
Figure 3:
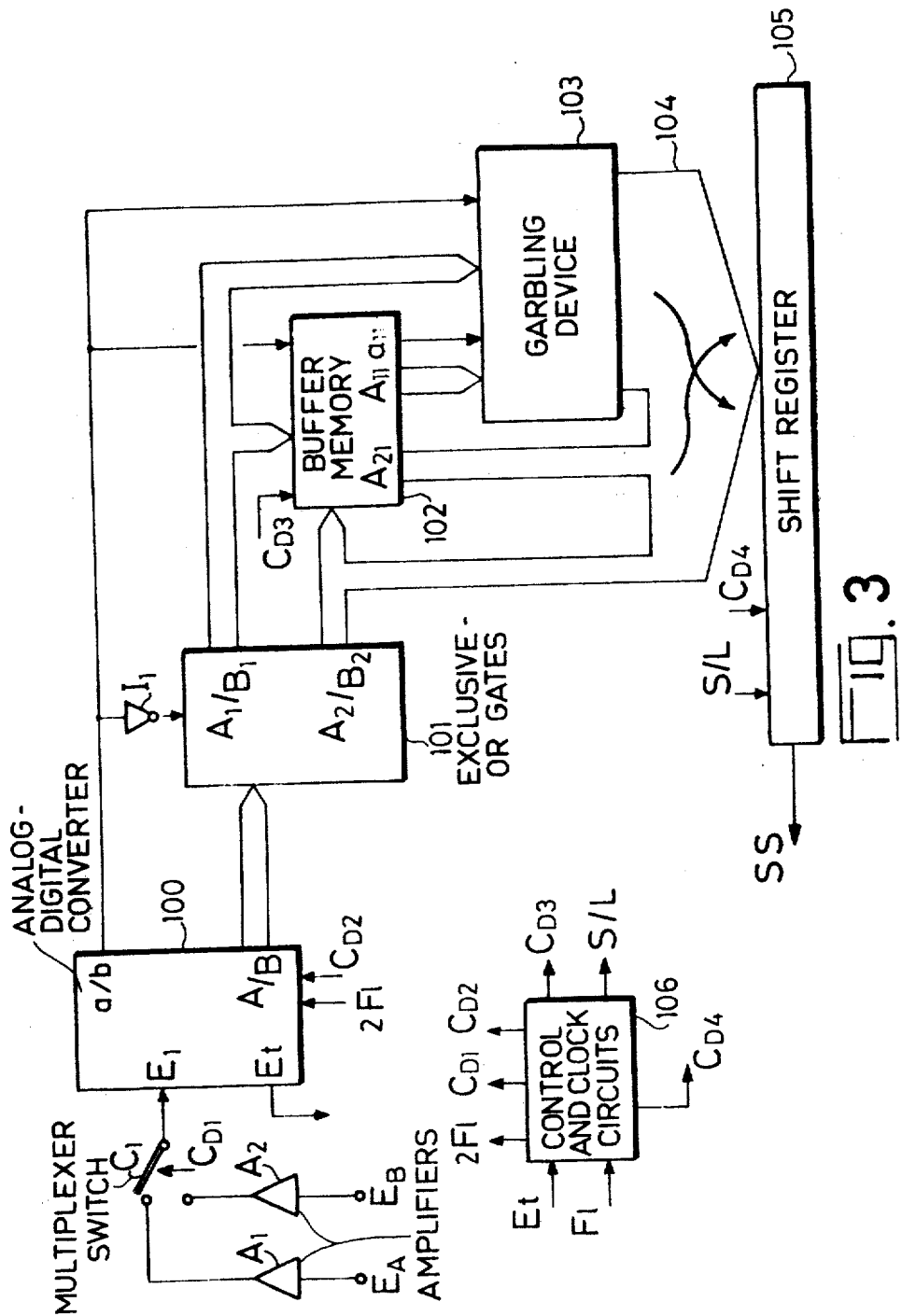
FIG. 3 a diagram of a coder according to the invention.
Figure 4:
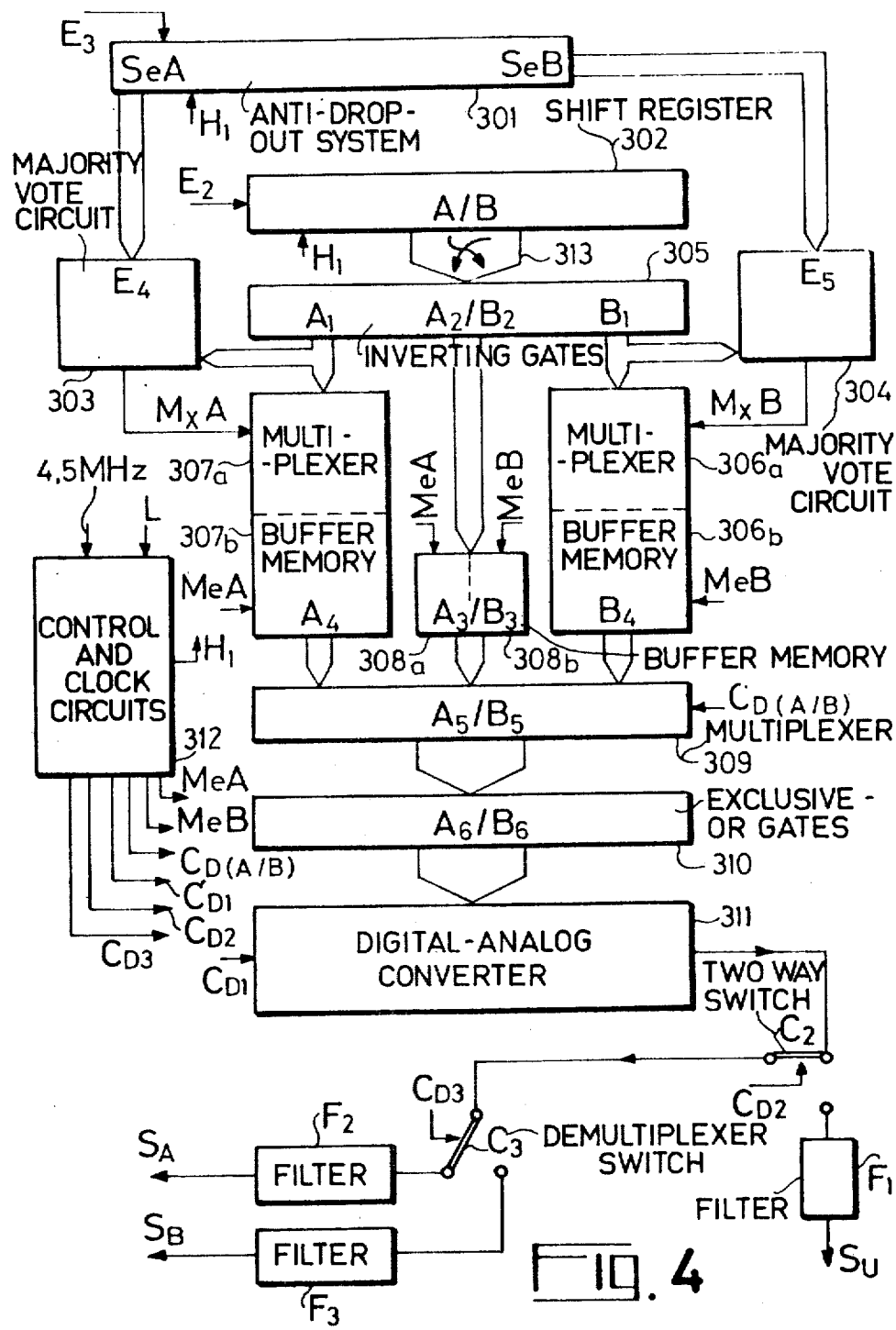
FIG. 4 a diagram of a decoder according to the invention.

With reference to FIGS. 2, 3 and 4 we will now describe a specific embodiment where the coding process according to the invention can be advantageously used.

FIG. 3 describes in a more detailed manner the coder referred to in FIG. 1. Reference will be made hereinafter to a number of commercially available integrated circuits. Unless otherwise indicated these will be circuits appearing in the catalogue of TEXAS INSTRUMENTS. The analog signals of channel A and channel B (received at inputs EA and EB) are brought to appropriate levels by two amplifiers $A_1$, $A_2$ for example of the RCA CA 3140 type. The thus amplified signals activate the input of an analog-digital converter 100 of the Teledyne Philbrick 4129 QZ type via a circuit $C_1$, which is an electronic switch (analog device) AD 7512 DI, controlled at the known frequency rate Fl (see FIG. 2; Y4). A logic signal at frequency 2Fl activates the conversion control input (input 2Fl) of analog-digital converter 100. The logic status output (Et) of converter 100 indicates that the converter is active (level 1) or has stopped being active (level 0). At the output of converter 100 there are bits leaving in parallel on bus A/B: bits $2^0$ to $2^8$ and output a/b: bit $2^9$. These bits are coded in accordance with the table of FIG. 5 and which is in accordance with the prior art. It is therefore necessary to carry out a first transformation according to a first variant of the process of the invention to obtain the coding given by the table of FIG. 6. This is carried out by following the A/D converter by a group of EX-CLUSIVE-OR gates 101 for example 74 LS 86 and an inverting gate $I_1$ e.g. forming part of an integrated circuit 74 LS 04. The output bus $A_1/B_1$ represents the bits of weights $2^5$ to $2^8$ and output bus $A_2/B_2$ the bits of weights $2^0$ to $2^4$. The bit of weight $2^9$ is not transformed, as stated hereinbefore. Blocks 102 represents the buffers of type 74 LS 378 necessary for the multiplexing of channels A and B.

Therefore the signal of channel A is converted during the time $t_1$ (see on the time diagram of FIG. 2: Y1 which represents the status signal available at the output Et of converter 100). It is then stored in the buffers 102 during the conversion of the signal of channel B which takes place during time $t_2$. At the end of time $t_2$ (conversion of channel B) there are simultaneously on the one hand the output from the buffers bits of the signal of channel A converted during time $t_1$ (FIG. 2: Y2) and on the other at the output from the converter 100 bits of the signal from channel B converted during the time $t_2$ (FIG. 2: Y3). A shift-load signal S/L (FIG. 2: Y5) then gives access via the garbling device 103 according to a third variant of the coding process of the invention to shift registers 105 of the 74 LS 165 type with parallel inputs and series outputs. The connections 104 are such that the order of the bits shown in FIG. 8 is respected. The garbling circuits are constituted by a group of inverting gates as the same type as $I_1$. It is obvious that in addition to the control signal described hereinbefore the buffer memory sequential circuits and shift registers also receive clock signals and other operating signals CD1 to CD4. The latter are supplied by control and clock circuits diagrammatically indicated by box 106. The circuits forming this box are not described in greater detail because they are dependent on the choices made for the circuits forming the coder of FIG. 3 and which have only been given for information there are numerous other components being commercially available. It is possible to use circuits such as 74 LS 221, 74 LS 393, 74 LS 74 etc.

In the same way the series signals coded according to the process of the invention and available at output SS are processed by all known means so as to be recorded on a support such as a video disc recorder-reader with optical inscription (reference numeral 2 in FIG. 1) within the preferred constructional scope of an audiovisual signal diffusion system.

FIG. 4 describes in greater detail the sound decoder 3 of FIG. 1. The decoder receives line synchronisation signals (L) and 4.5 MHz clock signals from the video disc reader. These signals are also necessary for image synchronisation purposes. It also receives the sound bits forming the video demodulator of the reader and control signals for correcting the erroneous signals by the anti-drop-out system 301 referred to hereinbefore.

The sound bits from a conventional reading demodulator are stored in a shift register 302 with a series input E2 and parallel outputs A/B. The latter are connected to a group of inverters 305 by means of an appropriate cable 313 for classifying the read bits. This circuit is intended to cancel out the garbling action performed in the coder. Thus, we have output bus $A_1$, $B_1$ (highest weight bits) and $A_2/B_2$ (lowest weight bits) of the bit code as recorded before garbling.

We will now study the operation of the decoding of channel A, channel B being identical in all points.

The bits corresponding to words $A_1$, and $A'_1$ of channel A, and words $A'_1$ and $A''_1$ are compelled in the comparison and majority vote circuit 303, comprising more particularly EXCLUSIVE-OR gates.

Using the same clock H1, i.e. precisely at the same time, the indications of the erroneous signals from the reader are stored in the shift register 301 with series input E3 and parallel outputs SeA and SeB.

On obtaining one of the conditions $A_1 = A'_1 = A''_1$ or $A_1 = A'_1$ or $A_1 = A''_1$ word $A_1$ is passed via bus $A_1$ to the input of buffer 307b via multiplexer 307a controlled by signal $M_xA$, provided that no erroneous signal indication is present in one or more locations corresponding to word $A_1$ of shift register 301. If only equality $A'_1 = A''_1$ is obtained or obtaining the equality $A_1 = A'_1 = A''_1$, but an erroneous signal indication is present in one or more locations corresponding to word $A_1$ of register 301 it is word $A'_1$ which is passed to the input of the buffer, provided that no erroneous signal indication is present in one or more locations corresponding to word $A'_1$ of register 301. If all the above conditions have been fulfilled for passing either word $A_1$ or word $A'_1$ to the input of the memory the pulse permitting the access to the buffer is transmitted to input MeA. If, however, and of the following equalities is not checked: $A_1 = A'_1$, $A_1 = A''_1$ or $A'_1 = A''_1$ or if there is an indication of erroneous signals in one or more of the locations corresponding to words $A_1$ or $A'_1$ of register 301 which has been selected no pulse giving access to buffer MeA is transmitted so that the outputs of the memory will retain the state which they had during the previous train of bits having represented a word recognised as good by the system in order to carry out the already described information protection function. Multiplexing obviously only takes place on the highest weight bits which are the only ones transmitted several times. The lowest weight bits are transmitted via bus $A_2/B_2$ to a second buffer memory 308.

The outputs of the buffers of channel A 307b–308a and channel B 306b–308b are connected to multiplexer 309 which permits the passage to the digital-analog converter 311 of the bits of channel A and the bits of channel B alternating at the rhythm of the line frequency (lasting half a line for channel A and half a line for channel B) under control CD A/B). EXCLUSIVE-OR operators 310 inserted between converter 311 and multiplexers are used for carrying out the opposite operation to that of coding, i.e.:

$$(\overline{2^9} + 2^8) \oplus \overline{2^9} = 2^8 \text{ etc} \ldots$$

$$(\overline{2^9} + 2^7) \oplus \overline{2^9} = 2^7 \text{ etc} \ldots$$

at the output from converter 311 an electronic switch C3 passes the channel A signal to output SA and channel B signal to output SB via 7.5 kHz pass band output filters $F_2$ and $F_3$.

In the case of a recording with a single 15 kHz pass band channel the output of converter 311 can be directly connected to a 15 kHz pass band output filter $F_1$ via a switch $C_2$.

All the control and clock signals $CD_2$ to $CD_3$ necessary for the satisfactory operation of the decoder (other than those already referred to) are generated by conventional circuits symbolized, as in the case of the sound coder, by a single box 312. In the same way the analog signals available at outputs SA and SB or SU are processed by any appropriate circuits with a view to their subsequent reproduction.

As non-limitative examples the following integrated circuits which, except when otherwise indicated, are available in the catalogue of TEXAS INSTRUMENTS can be used:

| | |
|---|---|
| shift registers 301,302 | 74 LS 164 |
| inverters 305 | 74 LS 04 |
| comparison circuits | 74 LS 85 |
| majority vote circuits 303-304 | 74 LS 260 |
| buffer and multiplexing circuit 306-307 | 74 LS 399 |
| multiplexing circuit 309 | 74 LS 157 |
| EXCLUSIVE -OR gates 310 | 74 LS 86 |
| digital-analog converter 311 | Motorola 3410 |
| switches C2, C3 | Analog device AD 7512 D1 |
| control and clock circuits 312 | 74 LS 20 |
| | 74 LS 221 |
| | 74 LS 74 |
| | 74 LS 393 |
| | 74 LS 00 |
| | 74 LS 30 |

The invention is not limited to the embodiment described and represented. The process is based on a selected coding and an original topological arrangement of the digital signal bits in such a way that they are affected to the minimum by deteriorations which can occur during the transcription process, whereby essentially only simple inexpensive circuits are used, such as inverting gates, EXCLUSIVE-OR gates, etc.

Without passing beyond the scope of the invention it would be possible to use slightly different devices for example the use of a message having a different number of bits (11 or 12 bits instead of 10 or any other number) or the protection of a number of bits differing from that described (4 or 6 instead of 5 or any other number).

According to a simplified variant it is possible to only use part of the message protection methods described hereinbefore, e.g. it would be possible to eliminate the complicated decoding of the detection signal of the reader erroneous signal.

However, in the further developed variant it would be possible to add supplementary protection means such as for example a control of the change of state of the two or three higher rate bits as a function of previously received messages. By adapting the same method it would also be possible to transmit 3×5 kHz. pass bands or 4×3.5 kHz. pass bands, etc.

Although more particularly directed at satisfying the requirements of a video disc system this coding process could be used on any other recording support or carrier, e.g. magnetic tapes. The reading/writing means can be either optical or magnetic.

The coding process could also be used with different line scanning frequencies than those used in the present description, whereby the possible pass bands of the transmitted signal (here 7.5. or 15 kHz) would vary in proportion to the line scanning frequency used.

It should be noted that the acoustic frequencies of the sound channels are only limited with respect to the higher value. The system can transmit very low frequencies up to a limit close to the constant level.

Finally the coding process could be used alone, by adding to it synchronisation means, i.e. without necessarily being accompanied by a video television signal. It could, however, be accompanied by a signal other than a video television signal.

What is claimed is:

1. A method for coding analog signals at acoustic frequencies into coded digital words which are to be recorded alternatively with video signals onto an information carrier for the subsequent reading thereof, the recording and subsequent reading forming a transcription process, the coding method intended to protect the thus coded digital words from alterations encountered during the transcription process, the method for coding comprising:

analog to digital converting the analog signals into multi-bit digital words on parallel outputs;

first transforming the digital words analog-digital converted in accordance with a first transformation function to protect the digital words representing analog signal levels within a first predetermined low range from large erroneous variations due to a deterioration of only a few bits thereof, the first transformation function being as follows- (a) no alteration to the highest order bit of a digital word and (b) combining the lowest order bit of the digital word with the inverse of the highest order bit of a digital word;

parallel to series converting the first transformed digital words;

transmitting the series form digital words, resulting from the previous step, according to the following scheme-transmitting the higher order bytes of series form digital words several times with the lower order byte of the series form digital words interspersed among the repeated higher order bytes in such a manner that the distribution function related to the overall information transfer reduces to a minimum the risk of overall deterioration;

second transforming the successively transmitted series form digital words in accordance with a second transformation function permitting a subsequent error detection during an overall deterioration, the second transformation function comprising garbling the various bytes of successfully transmitted digital words.

2. A coding method according to claim 1, wherein the step of first transforming comprises the step of transforming using an EXCLUSIVE-OR logic operation.

3. A coding method according to claim 1, wherein the step of transmitting comprises the step of transmitting the transformed digital words three times to obtain a triple redundancy.

4. A coding method according to claim 1, wherein garbling in the step of second transforming is performed by the selective inversion of bits of successively transmitted digital signals.

5. A coding method according to claim 4 wherein during the garbling of the second transforming step, only the highest weight bits undergo garbling.

6. A coding method according to claim 1, wherein the step of analog-digital converting comprises the step of analog to digital converting analog signals from a single analog signal source.

7. A coding method according to claim 1 wherein the step of analog to digital converting comprises the step of analog to digital converting a signal derived by the interconnected sampling of several different analog signal sources.

8. A coding method according to claim 7, further including, after the step of first transforming, the step of multiplexing in time the first transformed digital words derived by the interconnected sampling of the analog singals.

9. A coding method according to claim 8, wherein the step of time multiplexing comprises the step of intermediately storing the digital words.

10. A method for decoding coded digital words read from an information carrier wherein the coded digital words were formed by (a) first transforming parallel digital words representing samples of analog signals, the first transforming being in accordance with a first transformation function being as follows- (1) not altering the highest order bit of a digital word and (2) combining the lowest order bit of a digital word with the inverse of the highest order bit of a digital word; (b) parallel to series converting the first transformed digital words; (c) transmitting the series form digital words by repeating the higher order bytes of the words several times and interspersing the lower order bytes of the words between the repeated higher order bytes; and (d) second transforming the transmitted digital words in accordance with a second transformation function comprising garbling various bits of the words successfully transmitted; the method for decoding comprising the steps of:

- third transforming in accordance with a third transformation function, inverse to the second transformation function, the various bits of the coded digital words read from the information carrier, this transforming step cancelling the effects of the second transformation function which included garbling;
- in the event of detection of no alteration of digital words, transforming in accordance with a fourth transformation function, inverse to the first transformation function, the first of the digital words successfully transmitted following an intermediate storage thereof; and
- in the event of an indication of alteration of a digital word, voting, according to a majority vote function, the third transformed digital words read from the information carrier to provide a voted digital word and then fourth transforming the voted digital word according to the fourth transformation function inverse to the first transformation function.

11. A decoding method according to claim 10 fur use with a plurality of multiplexed digital signals, further comprising the step of supplementary time demultiplexing the stored digital signals.

12. A decoding method according to claim 10, wherein the intermediate storing during the third transforming step is inhibited when an irreperable alteration or deterioration of a digital word is encountered.

13. A digital coder for coding analog signals at acoustic frequencies into digital words which are to be alternately recorded with video signals onto an information carrier capable of introducing alterations to the recorded digital words, the recorded words being intended for subsequent reading and playback, comprising:

- means for sampling the analog signals at predetermined intervals of time to produce analog samples;
- an analog-digital converter for converting such samples into multi-bit digital words on parallel outputs thereof;
- a first logic circuit, adapted to receive the parallel outputs from the analog-digital converter;
- a second logic circuit adapted to receive the highest order output bits of the first logic circuit;
- a shift register providing a series output and having plural inputs coupled to the first and second logic circuits, the shift register being so coupled so as to receive the lowest order output bits from the first logic circuit and all of the output bits of the second logic circuit in such a manner that the bits of the digital words present on the output of the second logic circuit are recorded several times into the shift register and the bits of the digital word present on the output of the first logic circuit are recorded once only each and are inter-spaced with the several times recorded digital word outputs from the second logic circuit.

14. A digital coder according to claim 13, wherein the first logic circuit comprises an inverting gate and "EXCLUSIVE-OR" logic gates.

15. A digital coder according to claim 13, wherein the second logic circuit comprises inverting gates.

16. A digital coder according to claim 13 for use with sound signals from several sources having to be multiplexed further comprising a buffer store for receiving the outputs of the first logic circuit and having outputs selectively connected to the inputs of the second logic circuit and to inputs of the parallel input shift register.

17. A decoder for coded digital words read from an information carrier wherein the coded digital words were formed by (a) first transforming parallel digital words representing samples of analog signals in accordance with a first transformation function being as follows: (1) not altering the highest order bit of a word and (2) combining the lowest order bit with the inverse of the highest order bit of a digital word; (b) parallel to series convering the first transformed digitial words; (c) transmitting the series form digital words by repeating the higher order bytes of the words several times and interspersing the lower order bytes of the words between the repeated higher order bytes; and (d) second transforming in accordance with a second transformation function comprising garbling various bits of the words successfully transmitted; the decoder comprising:

- a first logic circuit;
- anti-drop-out means including a shift register having a series input and parallel outputs coupled to the input of said first logic circuit;
- comparison and majority vote circuit means, receiving the highest order bit outputs from the first logic circuit and signals from the anti-drop-out means;
- a multiplexing circuit for receiving the control signals from the comparison and majority vote circuits and the highest order outputs from the first logic circuit and providing multiplexed signals on outputs thereof;
- a first buffer store coupled to the outputs of the multiplexing circuit;
- a second buffer store for receiving the lowest order output bits from the first logic circuit;
- a second logic circuit having inputs coupled to the outputs of both the first and second buffer stores; and
- a digital to analog converter having parallel inputs coupled to the outputs of the second logic circuit.

18. A decoder according to claim 17, wherein the first logic circuit comprises inverting gates.

19. A decoder according to claim 17, wherein the second logic circuit comprises EXCLUSIVE-OR logic gates.

20. A decoder according to claim 17, for use with digital signals representing sound signals from several sources to be multiplexed, further comprising a multiplexer for receiving the outputs of the first and second buffers and having outputs that are connected to the inputs of the second logic circuit.

21. A digital coder according to claim 17 wherein the information carrier comprises an optically readable and writable medium.

22. A digital coder according to claim 17 wherein the information carrier comprises a magnetically readable and writable medium.

* * * * *